US011285914B2

United States Patent
Alu et al.

(10) Patent No.: US 11,285,914 B2
(45) Date of Patent: Mar. 29, 2022

(54) ANTI-THEFT ROLLAWAY PREVENTION HANDLE ASSEMBLY INCORPORATED INTO A MANUAL PARK RELEASE MECHANISM

(71) Applicant: Kuster North America, Inc., Troy, MI (US)

(72) Inventors: Calogero Alu, Shelby Charter Township, MI (US); Brian Andrew Mayville, Northville, MI (US); Christopher Soave, Oxford, MI (US)

(73) Assignee: Kuster North America, Inc., Troy, MI (US)

( * ) Notice: Subject to any disclaimer, the term of this patent is extended or adjusted under 35 U.S.C. 154(b) by 247 days.

(21) Appl. No.: 16/736,859

(22) Filed: Jan. 8, 2020

(65) Prior Publication Data
US 2020/0247358 A1 Aug. 6, 2020

Related U.S. Application Data

(60) Provisional application No. 62/801,403, filed on Feb. 5, 2019.

(51) Int. Cl.
| | | |
|---|---|---|
| *B60R 25/08* | (2006.01) | |
| *F16H 63/34* | (2006.01) | |
| *E05B 77/00* | (2014.01) | |
| *F16C 1/12* | (2006.01) | |
| *B60T 7/10* | (2006.01) | |

(52) U.S. Cl.
CPC ............ *B60R 25/086* (2013.01); *B60T 7/101* (2013.01); *E05B 77/00* (2013.01); *F16C 1/12* (2013.01); *F16H 63/3491* (2013.01)

(58) Field of Classification Search
CPC ....... B60R 25/086; B60T 7/101; B60T 7/047; E05B 77/00; F16C 1/12; F16H 63/3491; G05G 5/28; G05G 1/025; G05G 1/087; Y10T 74/20702; Y10T 74/20648; Y10T 74/20468; Y10T 74/20426
See application file for complete search history.

(56) References Cited

U.S. PATENT DOCUMENTS

| | | | | |
|---|---|---|---|---|
| 1,487,603 | A * | 3/1924 | Ratto ................... | B60R 25/086 70/195 |
| 2,126,234 | A * | 8/1938 | Weber ..................... | G05G 1/02 74/502 |
| 2,303,586 | A * | 12/1942 | Snell ........................ | G05G 7/02 74/503 |
| 5,291,764 | A * | 3/1994 | Chang ................... | B60R 25/086 188/265 |
| 7,823,983 | B2 | 11/2010 | Inagaki et al. | |
| 9,423,019 | B2 | 8/2016 | Albertson et al. | |
| | | | (Continued) | |

*Primary Examiner* — Daniel D Yabut
(74) *Attorney, Agent, or Firm* — Dinsmore & Shohl LLP

(57) ABSTRACT

An anti-theft and rollaway prevention handle assembly integrated into a park release mechanism of a vehicle. A housing has a recessed configuration supporting a park release pull handle engaged to the housing in a stowed position and preventing access to the handle. An unlock mechanism communicates with the handle via a latch such that, upon actuating the unlock mechanism, the latch being displaced to release the handle to project outwardly from the recessed configuration, permitting grasping of the same by a user in order to actuate the vehicle from the park position.

17 Claims, 3 Drawing Sheets

(56) References Cited

U.S. PATENT DOCUMENTS

| | | |
|---|---|---|
| 9,927,028 B2 | 3/2018 | Shin et al. |
| 2012/0325572 A1 | 12/2012 | Morgese |
| 2014/0326101 A1 | 11/2014 | Han et al. |
| 2015/0298663 A1 | 10/2015 | Tashiro |
| 2017/0138475 A1 | 5/2017 | Kim et al. |
| 2017/0343106 A1 | 11/2017 | Spooner et al. |
| 2018/0094724 A1 | 4/2018 | Devos et al. |
| 2018/0370501 A1 | 12/2018 | Singleton |

* cited by examiner

ANTI-THEFT ROLLAWAY PREVENTION HANDLE ASSEMBLY INCORPORATED INTO A MANUAL PARK RELEASE MECHANISM

CROSS REFERENCE TO RELATED APPLICATIONS

The present application claims the priority of U.S. Ser. No. 62/801,403 filed Feb. 5, 2019.

FIELD OF THE INVENTION

The present invention relates generally to manual park release mechanisms. More specifically, the present invention discloses a theft and rollaway prevention handle designed into a manual park release mechanism for recessing the handle in a non-exposed position relative to a housing for the park release mechanism. When a vehicle loses power or when the gear shift mechanism is not functional, a mechanism is needed to allow the transmission to being shifted in a Neutral position concurrent with the Park Release Mechanism being disengaged. This mechanism provides the additional function of anti-theft and rollaway prevention by requiring a lock to be disengaged in order to operate the mechanism.

BACKGROUND OF THE INVENTION

Parking release mechanisms are generally known in the art and which operate to engage and disengage the transmission from the park position during periods of time in which the vehicle loses power or the gear shift system is not functional, allowing the vehicle to be pushed or towed. Current technologies utilize any of a rigid handle or a tether. In the instance of a rigid handle, the user pulls to disengage the Park position.

Examples of existing Manual Park Release Mechanisms include that depicted in US 2018/0094724 to DeVos, and which discloses a handle assembly including a base, a handle pivotally connected to the base, and a lock piece. The handle is pivotable between an open position and a closed position, with the lock piece designed to selectively lock the handle in open position and to release the handle and allow it to pass back to closed position after the handle is pulled from lock position.

Additional features of the park release system in DeVos '724 include a cable connector assembly which includes a first cable section connectable to a second cable section. The second cable section includes a housing having a slider within a passageway and below a flexible retention beam. The slider is configured to receive and connect to the cable from the first cable section.

Another example from the prior art includes the Lee 2014/0326101 which teaches a cable pulling device having a base, a lever connected rotatably relative to the base and to which a cable is connected. A bar member and a spring member are also provided, the spring member being arranged between the lever and the bar member to pressurize the bar member toward the base, with the cable being pulled by standing up of the lever.

Also noted is the emergency release cable in Shin, U.S. Pat. No. 9,927,028 which teaches a lever bracket fixed to a position adjacent to a driver's seat. A handle lever is installed in the lever bracket so as to pivot around a pivot axis from a first position to a second position, wherein an end of the emergency release cable is fixed to the handle lever. A slider is provided having a lock protrusion for fixing the handle lever to the second position, and is linearly-movably coupled to the handle lever.

Other features include a spring finger fixed to the lever bracket, and engaged with the lock protrusion so as to block the handle lever from returning to the first position from the second position. A guide pin prevents the handle lever from being separated from the lever bracket, and pivotably supporting the handle lever.

Upon the handle lever being pivoted from the first position to the second position, the emergency release cable is pulled to switch the automatic transmission from the parking position to the neutral position. When the handle lever is pivoted to the second position, the lock protrusion and the spring finger are engaged to fix the handle lever to the second position and when a tension exceeding a predetermined magnitude is applied to the emergency release cable after the handle lever is fixed to the second position, the engagement between the lock protrusion and the spring finger is released while the slider is linearly moved in a direction away from the pivot axis.

SUMMARY OF THE INVENTION

The present invention provides a mechanism for retracting the actuating handle of a manual park release mechanism (when not in use) into a mating recess configuration designed into the architecture of the housing. As further depicted in the supporting illustrations, the park release mechanism includes provision of a rotatable or otherwise configured unlock mechanism, such as which can be key actuated and which in turn interfaces with a torsion spring supported latch or other suitable linkage mechanism for releasing the handle in a previously retracted position, the spring subsequently responding to an internal bias in order to "pop-out" of the recess configuration to enable the same to be grasped and actuated (such as to shift the transmission out of the park position).

As further described, the torsion spring operates to return the mechanism to the locked position. The handle bias can further include a separate spring built into the handle architecture, such further envisioned to include a coil spring for telescopically displacing an outer handle and integrated sleeve from a fixed inner coaxially supporting stem.

Additional features include the unlock mechanism further exhibiting a rotatable cap supported over the torsion spring mounted upon a projecting post of the housing. The latch contacts the cap which, upon being rotated, causes deflection of the latch to release the handle.

A key actuates the rotatable cap through a receiving slot defined in a forward face of the cap. The pull handle includes an outer portion with an integrated sleeve which is coaxially and telescopically supported upon a fixed inner stem. Other features include a second spring which is built into the handle architecture, and such as further is envisioned to include a coil spring for telescopically displacing the outer handle portion in response to actuation of the unlock mechanism.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to FIGS. 1-6, the present invention discloses a mechanism for maintaining the actuating handle (when not in use) in a retracted/stowed position within a mating recess configuration designed into the architecture of the housing. As further depicted in the supporting illustrations, this further includes provision of a rotatable or otherwise configured unlock mechanism, such as which can be key actuated and which in turn interfaces with a torsion spring supported latch or other suitable linkage mechanism for releasing the handle in a previously retracted position in order to "pop-out" of the recess configuration to enable the same to be grasped and actuated (such as to shift the transmission out of a park position).

As will be further described below, the torsion spring operates to return the mechanism to the locked position. A separate spring is built into the handle architecture, such further envisioned to include a coil spring for telescopically displacing an outer handle and integrated sleeve from a fixed inner coaxially supporting stem.

Current Park release technology (as further supported by the prior art references described herein) utilizes a rigid handle, such with or without a tether, for providing the necessary mechanical advantage for the user to apply the necessary load in order translate a Park position release cable to in turn actuate the vehicle transmission lever (not shown). The features associated with the anti-theft release handle of the present invention are understood to operate with any cable or linkage release structure associated with a Park release mechanism, such including those taught by the several prior art designs and including further those that operate a cable actuating (CAM) mechanism, exhibiting a separate pull handle and cable arranged in an angular offset (not limited to ninety degree) fashion to a park release transmission cable. As will be further described in reference to the attached illustrations, the pull handle operates in combination with a suitable rotating or translating component for engaging the park release transmission cable.

Figure 1:
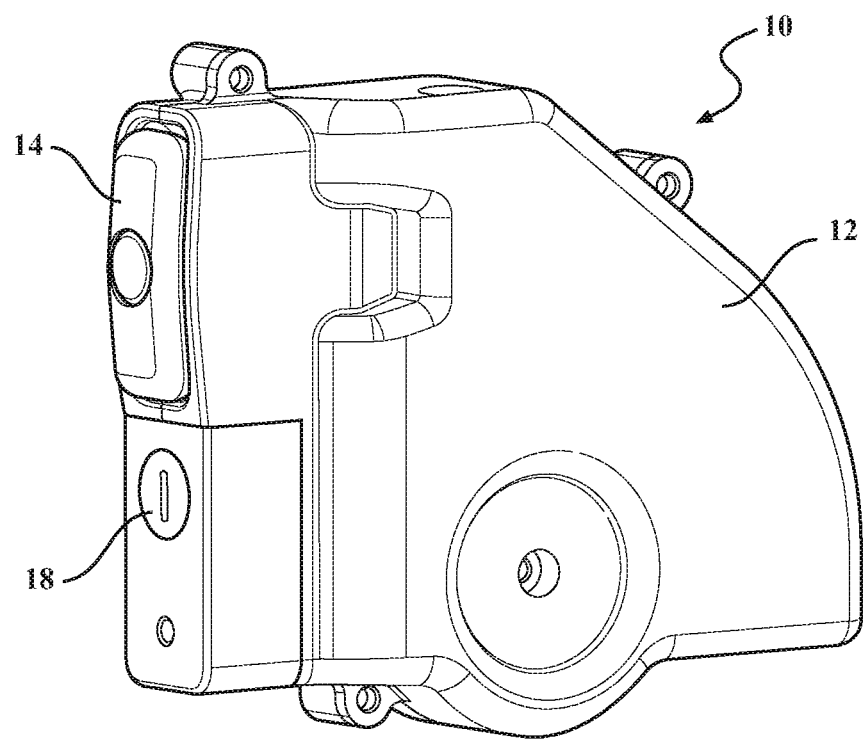
FIG. 1 is a perspective view of the anti-theft and rollaway prevention handle assembly integrated into a park release mechanism and illustrating the handle establishing a mating recessed and stowed configuration within the housing of the park release mechanism.

With reference now to FIG. 1, a perspective view is generally shown at 10 of the anti-theft and rollaway prevention handle assembly integrated into the park release mechanism according to one non-limiting illustrated embodiment of the present invention. The mechanism includes a three dimensional housing 12 which contains a package assembly (further reference being to the subsequent descriptions of FIGS. 3-6) for accomplishing actuation of a separate vehicle transmission lever (not shown).

Figure 2:
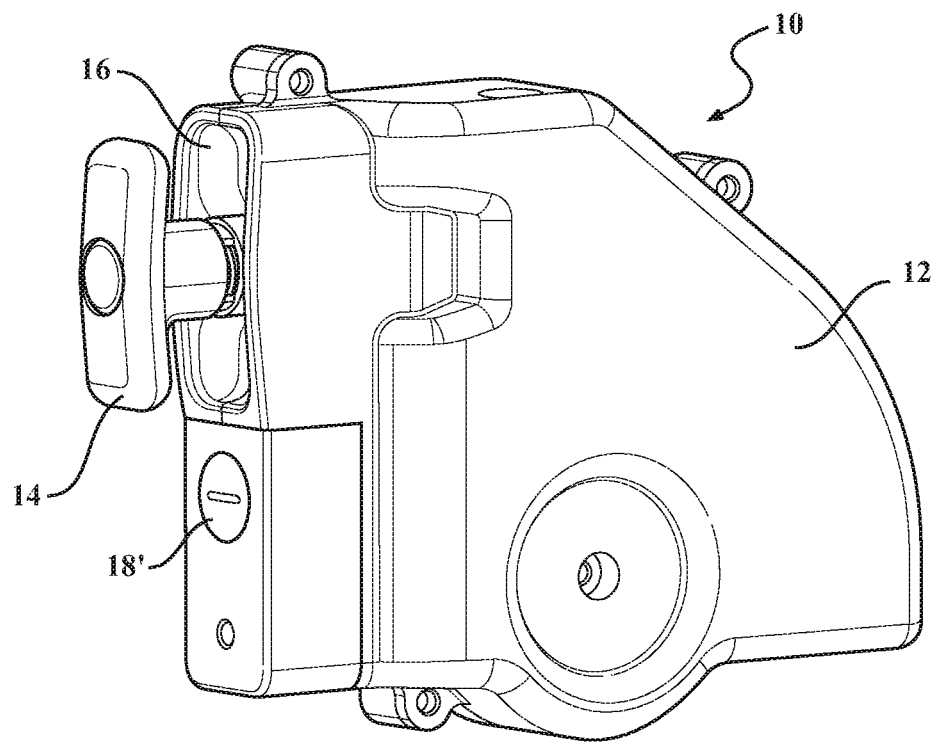
FIG. 2 is a further view similar to FIG. 1 illustrating the handle in an unlocked and accessible (unstowed) configuration in which it partially projects outwardly from the recessed configuration.

A handle 14 is shown which is established in a mating recessed and stowed configuration within the housing of the park release mechanism. As further shown in FIG. 2, the handle 14 is depicted in an unlocked and accessible configuration in which it partially projects outwardly from the recessed configuration, which is further depicted by cavity defining profile 16 in FIG. 2. Also depicted is an unlock mechanism in the form of a rotatable cap portion, this depicted at 18 and shown in a first lock position in FIG. 1 and a second rotated and unlock position, further shown at 18', in FIG. 2 in a ninety degree rotated position. The cap portion includes a slot (such receiving a key which is not shown) depicted in the first position 18 (FIG. 1) and second ninety degree rotated position 18' (FIG. 2).

Figure 3:
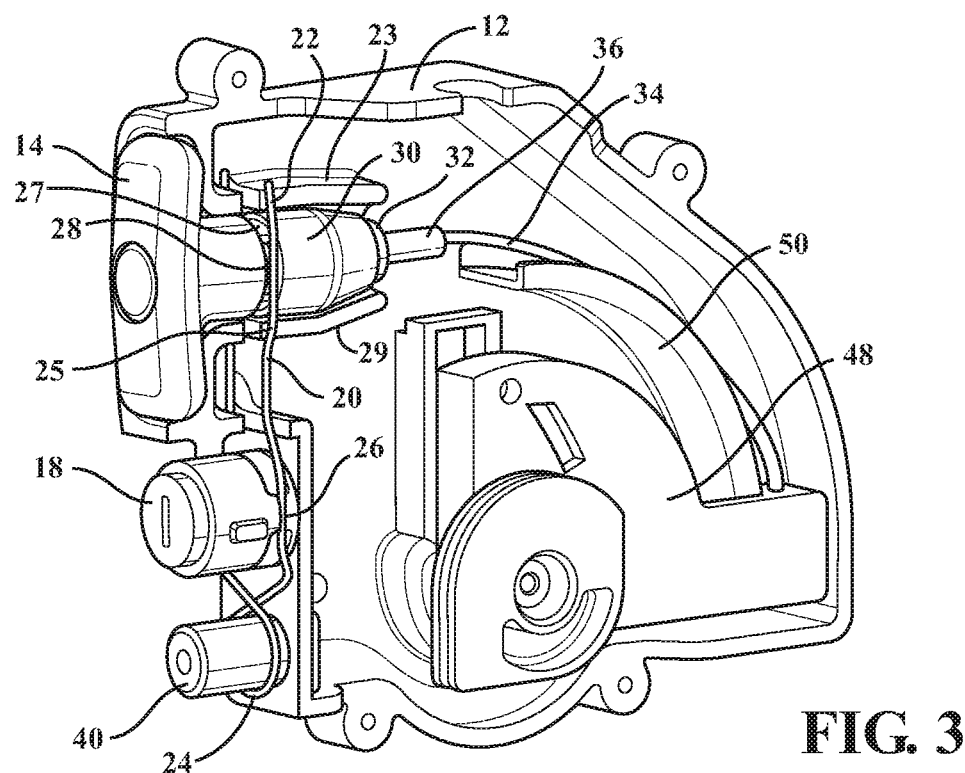
FIG. 3 is a perspective cutaway view of the handle assembly and park release mechanism of FIG. 1 and depicting the rotating unlock mechanism and latch with the handle in the stowed position.

FIG. 3 depicts a perspective cutaway view of the handle assembly and park release mechanism of FIG. 1 and depicting the rotating unlock mechanism (cover cap 18) and latch in the position of FIG. 1. A latch is provided as an elongated element 20 which is configured within the interior of the package assembly of the Park release mechanism and which is pivotally connected at upper and lower supported locations 22 and 24 associated with the package interior. The upper support location can include a ledge 23 configured within the housing 12 and to which the upper latch location 22 is supported.

As further shown, the elongated latch element 20 (such as which is provided in the shape of an elongated and shaped wire element is configured at intermediate locations including upper intermediate location 26 and lower intermediate location 28, these respectively being associated with each of the base rim location of the handle 14 and the rotatable cap 18. As shown, intermediate location 26 of the wire shaped latch 20 seats within a side notch or recess (at 27) of the handle 14 in the engaged position to prevent the handle from popping out or displacing from the recess 16 until desired (see as further described below).

As further depicted in FIGS. 3-6, a reverse angled portion 25 of the latch 20 is supported by a further ledge 29 and so that the upper intermediate portion 28 overlaps an opposite edge location of handle 14. The handle includes the outer grasping portion (again at 14), with an integrally formed outer coaxial portion 30 in contact with the latch 20 at the intermediate location 28 along with a hidden reverse location associated with the reverse angled portion 25. An inner coaxial portion 32 is configured within the package assembly and supports the outer coaxial portion 30 between the retracted position of FIGS. 1 & 3 and the extended positions of FIGS. 2 and 4-6.

A transmission actuating cable 34 is shown which is channeled within an arcuate guiding interior of the Park release package housing and includes a mounting portion 36 secured to a base location of the inner coaxial portion 32. A torsional spring 38 is configured for mounting upon a first stud or post 39 (see FIG. 5). In an alternate variant, an end-most portion of the latch 24 may be configured with multiple windings as the torsional spring 38, this again being shown in FIG. 5 (with the rotational cap portion 18 removed), and which is mounted to the first stud or post.

A second stud or post 40 is further shown and is supported within the package interior of the Park release mechanism, located below the first post 39, and about which is wound a lowermost turned portion, again at 24, of the latch 20. An upper and reverse angled portion 42 of the wire shaped latch 20 extends between the lowermost turned portion 24 and the torsional spring 38.

Accordingly, the latch 20 secures at its lower engagement location 24 to the post 40 and the curvature portion defining the extended leg 42 to the torsion spring 38 (FIG. 6) is in turn biased against the second post or stub 40. In this fashion, rotation of the cap portion 18 in the clockwise direction (at 44 in FIG. 4 and such as resulting from a key access) exerts against the bias of the torsion spring 38 (via the end projecting angled leg of the spring which is clearly depicted in FIG. 5), as the cap is rotated, the inclining bosses on the outer diameter of the cap push on the latch 20 arms, thereby causing the latch 20 to be deflected laterally (initially at location 26 contacting the cap portion 18 and consequently at further location 28 to separate from the outer coaxial portion 30 integrated with the handle 14).

At this point, a second spring (partially depicted at 46 in FIGS. 5-6) biases the outer coaxial portion 30 in the outwardly displacing (pop-out) position of FIG. 2 by which the grasping portion 14 of the handle is displaced outwardly from the recessed configuration 16 to the grasping position of FIG. 2. At this point, the handle 14 can be accessed by the user and pulled in an outward linear direction, which causes the cable 34 to pivot a guiding component 48 (FIGS. 3-4) mounted within the package housing. Although not shown, a further cable or linkage element can be provided which is secured to the guiding component 48 and, upon the transmission cable 34 being displaced along the arcuate guiding profile within the interior of the package housing (see guide wall 50), a sequential extending cable (again not shown) extends to the vehicle transmission in order to disengage the vehicle from the Park position.

Figure 4:
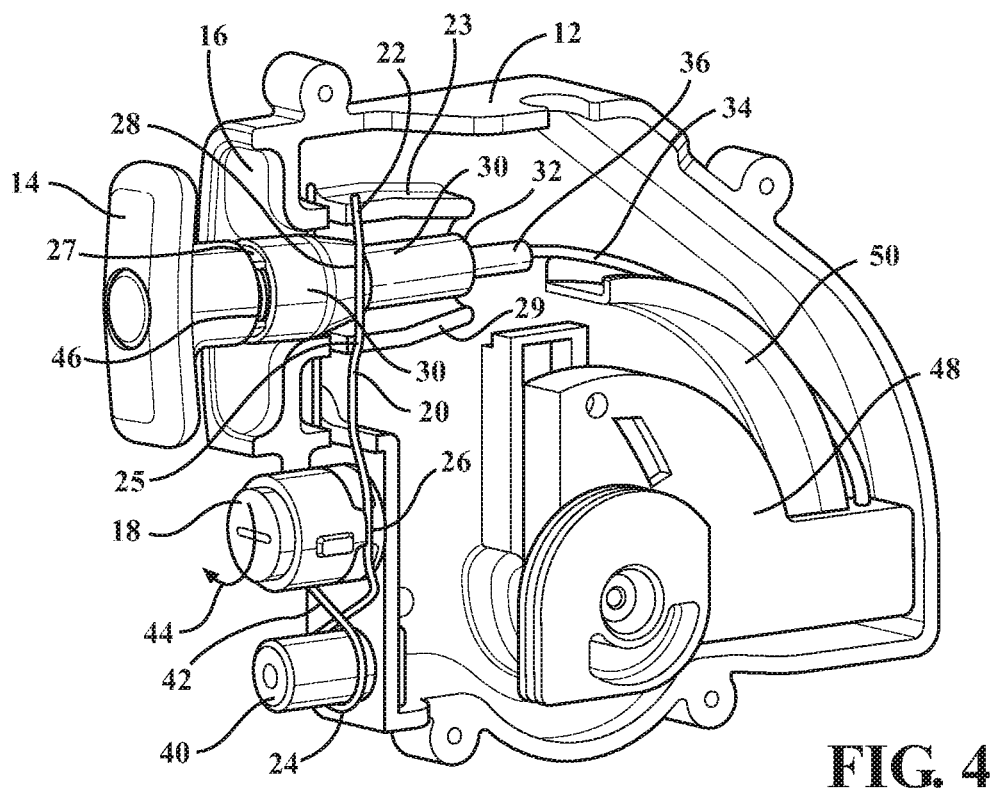
FIG. 4 is a similar perspective cutaway of FIG. 2 and depicting the unlock mechanism, with the handle in the unlocked position, such as which can be key actuated and which in turn interfaces with a torsion spring supported latch or other suitable linkage mechanism for releasing the handle in a previously retracted position in order to "pop-out" of the recess configuration, and to enable the same to be grasped and actuated (such as to release the parking brake)

FIG. 4 is a similar perspective cutaway of FIG. 2 and depicts the unlock mechanism, such as which can be key actuated and which in turn interfaces with a torsion spring and the latch or other suitable linkage mechanism for releasing the handle in a previously retracted position in order to "pop-out" of the recess configuration, and to enable the same to be grasped and actuated (such as to release the parking brake).

Figure 5:
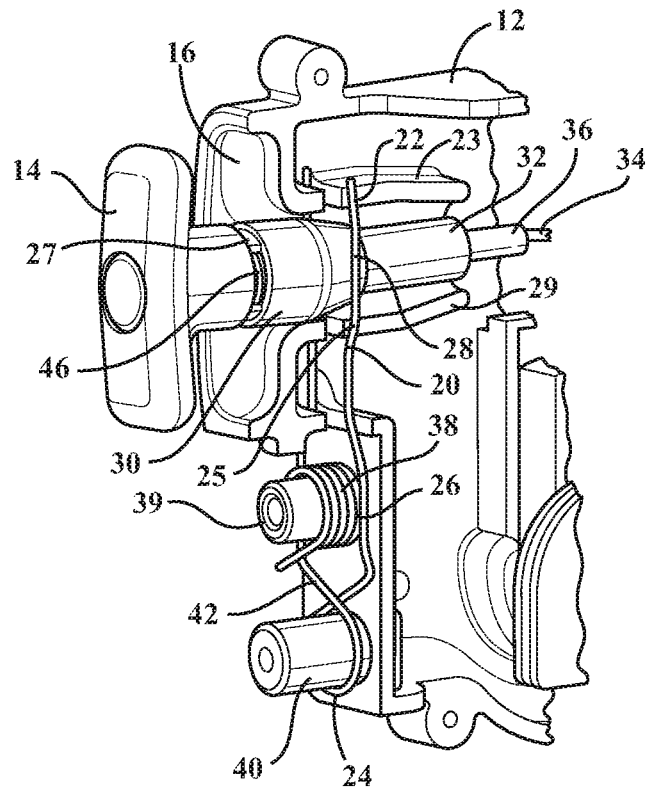
FIG. 5 is an enlarged partial view of FIG. 4, with the cover of the rotatable unlock mechanism removed and better illustrating the torsion spring which operates to return the mechanism to the locked position.
Figure 6:
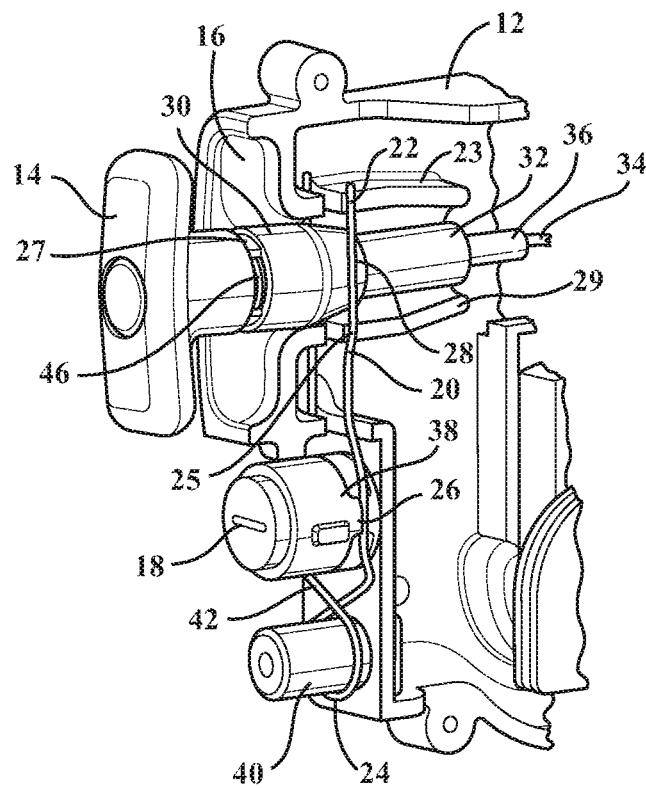
FIG. 6 is a similar enlarged illustration to that shown in FIG. 5 and depicting a separate spring which is built into the handle architecture, and such as further is envisioned to include a coil spring for telescopically displacing an outer handle and integrated sleeve from a fixed inner coaxially supporting stem.

FIG. 5 is an enlarged partial view of FIG. 4, with the cover of the rotatable unlock mechanism removed and better illustrating the torsion spring which operates to return the mechanism to the locked position. Finally, FIG. 6 is a similar enlarged illustration to that shown in FIG. 5 and depicting a separate spring which is built into the handle architecture, and such as further is envisioned to include a coil spring for telescopically displacing an outer handle and integrated sleeve from a fixed inner coaxially supporting stem.

In this fashion, the stowed handle provides improved robustness against misuse in loading. It is further understood that the lock mechanism does not have to be engineered to withstand significant loading if a user attempts to grab and pull the handle which is still locked, as the handle cannot be grabbed until the lock (rotatable cap portion) is first disengaged.

Having described my/our invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings are have been described in detail, various alternative designs and embodiments exist for practicing the disclosure defined in the appended claims.

The invention claimed is:

1. An anti-theft and rollaway prevention handle assembly integrated into a park release mechanism of a vehicle, comprising:
   a housing having a recessed configuration supporting a park release pull handle engaged to said housing in a stowed position and preventing access to said handle;
   an unlock mechanism communicating with said handle via a latch such that, upon actuating said unlock mechanism, said latch releasing said handle to project outwardly from said recessed configuration, permitting grasping of the same by a user in order to actuate the vehicle from the park position; and
   said unlock mechanism further including a rotatable cap supported over a torsion spring mounted upon a projecting post of said housing.

2. The assembly as described in claim 1, further comprising said latch contacting said cap which, upon being rotated, causes deflection of said latch to release said handle.

3. The assembly as described in claim 2, further comprising a key actuating said rotatable cap through a receiving slot defined in a forward face of said cap.

4. The assembly as described in claim 1, said pull handle further comprising an outer handle portion with an integrated sleeve coaxially and telescopically supported upon a fixed inner stem.

5. The assembly as described in claim 4, further comprising a second spring which is built into the handle architecture includes a coil spring for telescopically displacing the outer handle portion in response to actuation of said unlock mechanism.

6. A handle assembly integrated into a park release mechanism of a vehicle, comprising:
   a housing having a recessed configuration supporting a park release pull handle engaged to said housing in a stowed position and preventing access to said handle;
   a base of said handle including an outer coaxial portion displaceable relative to an inner coaxial portion;
   a spring bias influencing said outer coaxial portion in an outwardly displacing direction relative to said inner coaxial portion;
   an elongated latch configured within said housing, an intermediate portion of said latch engaging said outer coaxial portion of said handle in a first configuration to prevent outward displacement relative to said inner coaxial portion;
   a transmission actuating cable channeled within an arcuate guiding interior of said housing and including a mounting portion secured to a base location of said inner coaxial portion;
   an unlock mechanism which, upon engagement, laterally displacing said latch out of contact with said outer coaxial portion, allowing said handle to project outwardly from said recessed configuration, permitting grasping of the same by a user in order to displace said transmission cable to actuate the vehicle from a park position; and said unlock mechanism further including a rotatable cap portion mounted over a first post and against which said latch is biased.

7. The assembly as described in claim 6, further comprising a key access slot configured within said rotatable cap portion.

8. The assembly as described in claim 6, said elongated and wire shaped latch further comprising an upper supported end and a bottom supported end between said intermediate handle supporting location.

9. The assembly as described in claim 8, said bottom supported end of said wire shaped latch further comprising a second post located below said first post, a reverse upwardly angled end-most portion of said latch being configured with multiple windings as a torsional spring and over which is installed said rotatable cap portion, such that rotation of said cap displaces said latch laterally at said intermediate location.

10. The assembly as described in claim 9, said intermediate portion of said wire shaped latch further comprising an upper intermediate location in contact with said handle and a lower intermediate location in contact with said rotatable cap.

11. The assembly as described in claim 6, said spring bias influencing said outer coaxial portion in an outwardly displacing direction relative to said inner coaxial portion further comprising a second spring.

12. An anti-theft and rollaway prevention handle assembly integrated into a park release mechanism of a vehicle, comprising:
   a housing having a recessed configuration supporting a park release pull handle engaged to said housing in a stowed position and preventing access to said handle;
   a cable connected to said handle at a first end and channeled along a guiding interior of said housing, said cable connecting to a pivotally mounted guiding component at a second end, said guiding interior further comprising an arcuate guide wall integrated into said housing; and
   an unlock mechanism communicating with said handle via a latch such that, upon actuating said unlock mechanism, said latch releasing said handle to project outwardly from said recessed configuration, permitting grasping of the same by a user in order to actuate said guiding component and, by extension, the vehicle transmission in order to disengage the vehicle from the park position.

13. The assembly as described in claim 12, said unlock mechanism further comprising a rotatable cap supported over a torsion spring mounted upon a projecting post of said housing.

14. The assembly as described in claim 13, further comprising said latch contacting said cap which, upon being rotated, causes deflection of said latch to release said handle.

15. The assembly as described in claim 14, further comprising a key actuating said rotatable cap through a receiving slot defined in a forward face of said cap.

16. The assembly as described in claim 13, said pull handle further comprising an outer handle portion with an integrated sleeve coaxially and telescopically supported upon a fixed inner stem.

17. The assembly as described in claim 16, further comprising a second spring which is built into the handle architecture includes a coil spring for telescopically displacing the outer handle portion in response to actuation of said unlock mechanism.

* * * * *